UNITED STATES PATENT OFFICE.

MAXIMILIAN TOCH, OF NEW YORK, N. Y.

COMPOSITION FOR COATING METALS.

No. 841,603.          Specification of Letters Patent.          Patented Jan. 15, 1907.

Application filed February 7, 1906. Serial No. 299,988.

*To all whom it may concern:*

Be it known that I, MAXIMILIAN TOCH, a citizen of the United States, residing at New York, in the county of New York and State of New York, have invented certain new and useful Improvements in Composition for Coating Metals, of which the following is a specification.

This invention is a paint composition for coating iron and other metals and metallic structures to prevent their corrosion.

The composition consists, primarily, of calcium silicate, specifically the tricalcic, and a binder, preferably a salt of an organic acid, specifically calcium linoleate. The material is ground in any suitable vehicle, such as a solution of kauri resin in naphtha or turpentine, and suitable inert mineral diluents, pigments to give body and covering power, and coloring agents are added. When a metallic structure is painted with this composition and exposed to the weather, the calcium-linoleate binder is oxidized or decomposed, liberating calcium hydroxid, which acts as a perfect protection against corrosion.

In manufacturing the composition a pure tricalcium silicate is produced by fusing three parts of calcium carbonate with one part of aluminium silicate in a furnace heated to 1,700° Fahrenheit. The materials must be ground as fine as possible and must pass a two-hundred-mesh sieve. After the reaction the fused mass is withdrawn and finely ground. The silicate product must be kept out of contact with moisture before mixing it with the other ingredients of the composition.

The calcium linoleate is produced by heating a mixture of one part of calcium hydroxid and two parts of linoleic acid. This acid may be obtained by saponifying linseed, china-wood, or similar oils with a solution of sodium carbonate and decomposing the resulting sodium linoleate with weak sulfuric acid. The linoleic acid must be thoroughly washed and neutralized with barium carbonate before use.

The calcium linoleate is then thinned, for example, with a solution of a small percentage of kauri resin in naphtha or turpentine, and the resulting mixture constitutes a suitable vehicle in which the calcium silicate is ground.

The composition is now too alkaline and would decompose too rapidly if used without further additions. It is therefore mixed with an inert mineral diluent, such as finely-divided magnesia, silica, or alumina. The composition is also lacking in body and covering power for the reason that the calcic silicate and linoleate have nearly the same refractive index. A pigment—such as zinc sulfid or oxid, lead sulfid or carbonate, barium sulfate, or a mixture of zinc sulfid and barium sulfate—is therefore added. A desirable gray color may be given to the paint by adding a small amount of lampblack.

I claim—

1. A composition for coating metal, consisting essentially of calcium silicate and a binder.

2. A composition for coating metal, consisting essentially of calcium silicate and a weak organic acid salt.

3. A composition for coating metal, consisting essentially of calcium silicate and a weak calcium salt.

4. A composition for coating metal, consisting essentially of calcium silicate and a calcium organic acid salt.

5. A composition for coating metal, comprising tricalcium silicate and calcium linoleate.

6. A composition for coating metal, comprising tricalcium silicate, calcium linoleate and a mineral diluent.

7. A composition for coating metal, comprising calcium silicate, calcium linoleate, a mineral diluent and a pigment.

8. A composition for coating metal, consisting essentially of a stable body material and calcium linoleate.

In testimony whereof I affix my signature in presence of two witnesses.

MAXIMILIAN TOCH.

Witnesses:
  HARRY E. BAER,
  S. J. BINSWANGER.